(12) United States Patent
Mitamura et al.

(10) Patent No.: US 6,956,700 B1
(45) Date of Patent: Oct. 18, 2005

(54) WAVELENGTH DISPERSION COMPENSATING APPARATUS

(75) Inventors: Nobuaki Mitamura, Yokohama (JP); Shinji Maruyama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/901,219

(22) Filed: Jul. 29, 2004

(30) Foreign Application Priority Data

Mar. 25, 2004 (JP) .............................. 2004-089740

(51) Int. Cl.[7] .......................................... G02B 27/00
(52) U.S. Cl. ..................... 359/578; 359/577; 359/615; 398/147
(58) Field of Search ............................... 359/578, 577, 359/615, 872, 874, 876; 398/147, 158, 159

(56) References Cited

U.S. PATENT DOCUMENTS

| | | | |
|---|---|---|---|
| 6,607,278 B2 * | 8/2003 | Shirasaki et al. ............ 359/868 |
| 6,646,805 B2 * | 11/2003 | Mitamura et al. ........... 359/578 |
| 6,714,705 B1 * | 3/2004 | Lin et al. ...................... 385/37 |
| 6,744,991 B1 * | 6/2004 | Cao ............................. 398/147 |
| 2002/0122256 A1 | 9/2002 | Mitamura et al. |

FOREIGN PATENT DOCUMENTS

JP          2002-258207          9/2002

* cited by examiner

Primary Examiner—Fayez G. Assaf
(74) Attorney, Agent, or Firm—Staas & Halsey LLP

(57) ABSTRACT

A wavelength dispersion compensating apparatus of the invention comprises: a VIPA plate capable to output incident lights at different angles according to wavelengths; a variable dispersion diffraction grating which can angularly disperse the lights of respective wavelengths output from the VIPA plate, in a direction substantially perpendicular to a direction of angular dispersion in the VIPA plate and also capable to change an amount of the angular dispersion; a light return apparatus which condenses the output lights from the variable dispersion diffraction grating and reflects them by a mirror, to return them to the VIPA plate side; and a stage rotation mechanism which rotates a movable stage on which the lens and the mirror are mounted, according to a diffraction angle in the variable dispersion diffraction grating, so as to enable wavelength dispersion and wavelength dispersion slope to be given to a WDM light, to be changed independently. As a result, it becomes possible to compensate for, over a wide wavelength band, the wavelength dispersion and wavelength dispersion slope of the WDM light, which are propagated through an optical fiber to be accumulated.

10 Claims, 12 Drawing Sheets

(A)
SIDE VIEW WHEN VIEWING FROM DIRECTION A (B)
SIDE VIEW WHEN VIEWING FROM DIRECTION B

WAVELENGTH DISPERSION COMPENSATING APPARATUS

BACKGROUND OF THE INVENTION (1) Field of the Invention

The present invention relates to a wavelength dispersion (chromatic dispersion) compensating apparatus for compensating for wavelength dispersion and wavelength dispersion slope occurring in signal lights of respective wavelengths transmitted on optical fibers, in an optical communication of a wavelength division multiplexing (WDM) system.

(2) Description of the Related Art

In a conventional optical fiber communication system for transmitting information using light, a transmitter sends out an optical pulse via an optical fiber to a receiver. However, wavelength dispersion, also known as "chromatic dispersion", occurring in the optical fiber deteriorates the signal quality in the system.

Specifically, due to wavelength dispersion characteristics of the optical fiber, propagation speed of a signal light in the optical fiber is dependent on a wavelength of the signal light. For example, when an optical pulse having a long wavelength (for example, an optical pulse of a wavelength indicating red color) is propagated at a speed higher than an optical pulse having a short wavelength (for example, an optical pulse of a wavelength indicating blue color), the wavelength dispersion in the signal light is called normal dispersion. Conversely, when an optical pulse having a short wavelength (for example, a blue pulse) is propagated at a speed higher than an optical pulse having a long wavelength (for example, a red pulse), the wavelength dispersion in the signal light is called abnormal dispersion.

Accordingly, in the case where a signal light contains a red pulse and a blue pulse when sent out from a transmitter, the signal light is separated into the red and blue pulses while being propagated through the optical fiber, and then each separated pulse is received by a light receiver at different times.

As another example of optical pulse transmission, in the case where a signal light having wavelength components which are consecutive from blue to red is transmitted, the respective components are propagated through the optical fiber at different speeds, and thus the time-width of pulse waveform of the signal light is extended inside the optical fiber, resulting in the distortion of pulse waveform. Since all pulses include components within a limited wavelength range, this wavelength dispersion is extremely common in optical fiber communications systems.

Particularly in a high-speed optical fiber communication system, it is necessary to compensate for the wavelength dispersion in order to obtain high transmission performance.

In order to compensate for this wavelength dispersion, the optical fiber communication system needs to be provided with a "reciprocal dispersion component" which gives wavelength dispersion reciprocal to the wavelength dispersion occurring in the optical fiber to the optical pulse. In the conventional apparatuses, there exists the one capable to be used as this reciprocal dispersion component. For example, a dispersion compensating fiber has a specific cross-sectional refractive index distribution, and is capable to give wavelength dispersion reciprocal to wavelength dispersion occurring in a normal transmission path fiber to the optical pulse. Therefore, it can be used as the reciprocal dispersion component.

However, the dispersion compensating fiber is expensive in manufacturing cost, and it is necessary to make the fiber length thereof relatively long in order to sufficiently compensate for the wavelength dispersion occurring in the transmission path fiber. For example, to completely compensate for the wavelength dispersion occurred in the transmission path fiber of 100 km, a dispersion compensating fiber of between 20 km and 30 km is required. Therefore, there are caused problems of a large optical loss, and a large size.

Furthermore, in addition to the above dispersion compensating fiber, a chirped fiber grating can be used as the reciprocal dispersion component to compensate for the wavelength dispersion. A fiber grating is formed with, in the core thereof, a grating structure whose refractive index is changed at a half-wavelength period, using a phenomenon in which the refractive index of core-doped germanium oxide is changed with the ultraviolet beam irradiation. The chirped fiber grating is designed such that, by gradually changing the grating intervals in a longitudinal direction of the above fiber grating to reflect long wavelength components at long distances so that the long wavelength components are propagated for distances longer than propagation distances of short wavelength components. Accordingly, the chirped fiber grating can also give the reciprocal dispersion to the optical pulse.

However, since the chirped fiber grating has a reflective band of very narrow wavelength width, it is difficult to realize a sufficient reflective band for compensating for wavelength dispersion of a light containing a large number of wavelengths such as a WDM light. It is possible to connect in cascade multiple chirped fiber gratings to realize a reflective band corresponding to the WDM light. However, there is a problem in that a system applying such a reciprocal dispersion component is expensive.

As one of conventional techniques to resolve these problems, there has been proposed an apparatus in which, for example, a device called a virtually imaged phased array (hereafter referred to as "VIPA") as shown in FIG. 18 is utilized to compensate for the wavelength dispersion occurring in the WDM light (refer to Japanese Unexamined Patent Publication No. 2002-258207).

This apparatus includes a VIPA plate 110 which demultiplexes the WDM light into a plurality of optical beams capable to be spatially discriminated from each other (for example, traveling directions of optical beams being different from each other), according to wavelengths, and a light return apparatus which reflects a light output from the VIPA plate 110 to return it to the VIPA plate 110 again. The VIPA plate 110 includes a transparent member 111 having parallel first and second planes 112 and 113. The first plane 112 of the transparent member 111 has a characteristic to reflect a light at the reflectance of approximately 100% except for a transmission area 114 formed on a part thereof, and the light passes through the transmission area 114, to be input to and output from the transparent member 111. The second plane 113 of the transparent member 111 has a characteristic to reflect a light at the reflectance lower than 100%. The light having passed through the transparent area 114 to be input to the transparent member 111 is multiple-reflected repeatedly between the first and second planes 112 and 113. At this time, a few percent of the light is transmitted through the second plane 113 to be emitted to the outside of the transparent member 111. The lights transmitted through the transparent member 111 interfere mutually and generate a plurality of optical beams capable to be spatially discriminated, traveling directions of which are different from each other, according to wavelengths. The VIPA plate 110 is a device with angular dispersion, since the output lights can be discriminated from each other according to traveling angles thereof. The light return apparatus reflects the output light from the VIPA plate 110, to return it to the VIPA plate 110. The light reflected by the light return apparatus is transmitted through the second plane 113 to be input to the transparent member 111, and is multiple-reflected repeatedly between the first and second planes 112 and 113, to be output to an input path from the transparent area 114.

Furthermore, the above VIPA plate 110 has the same wavelength as the wavelength of the input light, and has a function of generating a plurality of output lights having different orders of interference. The light return apparatus is provided with a structure in which the output light of one order of interference is returned to the VIPA plate 110, but the output lights of other orders of interference are not returned to the VIPA plate 110. Thus, only the light corresponding to one order of interference passes through the VIPA plate 110, to be output to the input path.

Moreover, the above light return apparatus is provided with a lens 160 and a mirror 170, as a specific configuration thereof. The lens 160 has a function of condensing the lights output from the VIPA plate 110 to the different directions according to the wavelengths, onto different positions on the surface of the mirror 170, and also orienting the lights reflected by the mirror 170 to the VIPA plate 110. The mirror 170 is located such that the light traveling from the VIPA plate 110 to the lens 160, and the light returning from the lens 160 to the VIPA plate 110 are propagated in parallel and opposite directions, and are prevented from being overlapped with each other. As a result, the lights of respective wavelengths reflected by the light return apparatus are propagated for different distances, so that the wavelength dispersion of the WDM light is compensated for.

As described in the above, the apparatus using the VIPA plate 110 has the angular dispersion function similar to a diffraction grating, and is capable to compensate for the wavelength dispersion occurring in WDM light. In particular, a VIPA-type wavelength dispersion compensating apparatus has a feature capable to generate considerable angular dispersion, and accordingly, can readily provide a practical reciprocal dispersion component.

A practical reciprocal dispersion component for use in a WDM transmission system is required to serve the following special needs.

A wavelength dispersion characteristic of an optical fiber generally in practical use is not constant depending on wavelength as shown in FIG. 19 for example, and frequently has a slightly positive inclination (wavelength dispersion is increased as the wavelength becomes longer). Such an inclination of wavelength dispersion is referred to as wavelength dispersion slope, or second order wavelength dispersion. Specifically, in a typical 1.3 $\mu$m zero-dispersion single mode fiber (SMF) as shown by the dotted line in FIG. 19, for a light of wavelength 1550 nm, the wavelength dispersion per 1 km is +16.79 ps/nm/km, while the wavelength dispersion slope per 1 km is 0.057 ps/nm$^2$/km. In the case where the necessary wavelength bandwidth is 35 nm for example, a variation in wavelength dispersion of approximately +2 ps/nm occurs within such a wavelength band.

The solid line in FIG. 19 indicates a characteristic of E-LEAF optical fiber manufactured by Corning Inc. In this E-LEAF optical fiber, for the light of wavelength 1550 nm, the wavelength dispersion is 3.852 ps/nm/km, and the dispersion slope is 0.083 ps/nm$^2$/km. On the other hand, the broken line in FIG. 19 indicates a characteristic of TW-RS optical fiber manufactured by Lucent Inc., and for the light of 1550 nm wavelength, the wavelength dispersion is 4.219 ps/nm/km, and the dispersion slope is 0.045 ps/nm$^2$/km. Furthermore, the respective wavelength dispersion characteristics in FIG. 19 are practically not linear, and strictly speaking, the inclinations (wavelength dispersion slope) of the wavelength dispersion are not constant. However, such third-order wavelength dispersion can be neglected since it presents very few problems at a transmission speed of approximately 40 Gb/s.

Here, if the wavelength dispersion in the optical fiber transmission path is considered in practice, as shown in FIG. 19, the wavelength dispersion and wavelength dispersion slope per unit length, are determined depending on the type of optical fiber used as the transmission path, and next, the actual wavelength dispersion and wavelength dispersion slope are determined depending on the length of the optical fiber (transmission distance). In the case where such actual wavelength dispersion in the optical fiber transmission path is compensated for with the reciprocal dispersion component, it is desirable to set the wavelength dispersion to be variable within a certain range, as a characteristic of the reciprocal dispersion component. This is because the types and transmission distances of the optical fiber are in infinite variety depending on the transmission speed and wavelength band of the transmission system, the timing at which the optical fiber was installed, and the conditions of the installation site.

Moreover, in the case of WDM transmission, it is insufficient even if only the wavelength dispersion can be compensated as described above, and the wavelength dispersion slope also becomes problematic. This is because, even if the dispersion can be compensated with a wavelength of a given signal channel, if the wavelength dispersion of the reciprocal dispersion component is constant, the wavelength dispersion cannot be compensated completely with a wavelength of a different signal channel. It is therefore desirable that the characteristic of the reciprocal dispersion component for WDM transmission has the wavelength dispersion slope. Furthermore, as described above, since the transmission distances are in infinite variety, and the wavelength dispersion slope is varied together with the wavelength dispersion in proportion to the length of the optical fiber, it is desirable that the wavelength dispersion slope is also set to be variable within a certain range.

However, a value of the wavelength dispersion slope to be given, is not determined uniquely with a wavelength dispersion value. This is because, not only the wavelength dispersion but also the wavelength dispersion slope are varied if the type of optical fiber is changed, as is apparent from FIG. 19. That is to say, in the case of WDM transmission, in order to compensate for the wavelength dispersion in the optical fiber transmission path by the reciprocal dispersion component, it is most desirable to set the wavelength dispersion and the wavelength dispersion slope to be variable independently within certain ranges.

However, although the wavelength dispersion can be set to be variable within a required range by the conventional reciprocal dispersion component as described above, it cannot have been realized that the wavelength dispersion and the wavelength dispersion slope are varied independently, as described above.

Specifically, for the dispersion compensating fiber, since it is possible to design an index profile having the reciprocal dispersion slope, a dispersion compensating fiber having the required wavelength dispersion and wavelength dispersion slope can be realized. However, in order to vary the wavelength dispersion and the wavelength dispersion slope independently, a dispersion compensating fiber having a variety of index profiles, and a variety of lengths, is necessary. Therefore, such a dispersion compensating fiber is not practical. Moreover, as described above, such a dispersion compensating fiber has problems of high cost, large loss, large size and the like.

Furthermore, in the chirped fiber grating, as with the dispersion compensating fiber, if the chirp design of chirped fiber grating is optimized, the reciprocal dispersion slope can be given. However, in order to change the value thereof, a variety of index profiles and a variety of lengths, are necessary. Therefore, such a chirped fiber grating is not practical. Even if the temperature is changed to vary the wavelength dispersion and the wavelength dispersion slope, since the wavelength dispersion slope value is determined uniquely with the wavelength dispersion value, the wavelength dispersion and the wavelength dispersion slope cannot be varied independently. Additionally, as described above, it is also hard for the chirped fiber grating to obtain the sufficient wavelength bandwidth for compensating for the light having a large number of wavelengths such as WDM light.

Moreover, in the reciprocal dispersion components using conventional diffraction gratings, there is a possibility of varying the wavelength dispersion and the wavelength dispersion slope independently to a certain extent depending on how the diffraction gratings are combined. However, since there is a limit in the angular dispersion obtainable within practical dimensions of typical diffraction gratings other than the VIPA, it is difficult to give the sufficiently large angular dispersion capable to compensate for the wavelength dispersion of relatively large value, which occurs in the optical fiber communication system. Therefore, such a reciprocal dispersion component is not practical.

SUMMARY OF THE INVENTION

The present invention has been accomplished in view of the above problems, with an object of providing a wavelength dispersion compensating apparatus capable of generating an arbitrary wavelength dispersion and wavelength dispersion slope, to compensate for wavelength dispersion and wavelength dispersion slope of a WDM light, which have been propagated through an optical fiber to be accumulated, over a wide wavelength band.

In order to achieve the aforementioned object, a wavelength dispersion compensating apparatus of the present invention comprises: an optical component having two mutually parallel reflective surfaces, in which a light condensed in the one-dimensional direction is incident between the reflective surfaces, and a part of the incident light is transmitted through one of the reflective surfaces while the incident light being multiple-reflected on the reflective surfaces, so that lights dispersed, due to interference by the transmitted light, in a substantially linear direction at different angles according to wavelengths are output; a lens which condenses the lights of respective wavelengths output from the optical component; a mirror having a reflective surface which reflects the lights which have passed through the lens to be condensed, in which the reflective surface has a shape capable to give constant wavelength dispersion to the lights of respective wavelengths output from the optical component, in a direction substantially parallel to a direction of angular dispersion in the optical component, and also capable to give different wavelength dispersion to the lights of respective wavelengths output from the optical component, in a direction substantially perpendicular to the direction of angular dispersion in the optical component; and a slide mechanism which slides the mirror in the direction substantially perpendicular to the direction of angular dispersion in the optical component, to vary the wavelength dispersion to be given to the lights of respective wavelengths output from the optical component according to a sliding amount of the mirror. Moreover, the wavelength dispersion compensating apparatus comprises: a variable dispersion diffraction grating disposed between the optical component and the lens, which is capable to disperse the lights output from the optical component in different angles according to wavelengths, and also capable to change an amount of angular dispersion, in the direction substantially perpendicular to the direction of angular dispersion in the optical component; and a rotation mechanism which rotates the lens and the mirror integrally about a reference point on the variable dispersion diffraction grating according to a diffraction angle in the variable dispersion diffraction grating, wherein wavelength dispersion slope is varied independently of the wavelength dispersion, according to an angular dispersion amount of the variable dispersion diffraction grating and a rotation amount of the rotation mechanism.

In the wavelength dispersion compensating apparatus of the above configuration, the optical component corresponds to the conventional VIPA, and the variable dispersion diffraction grating generating variable angular dispersion is disposed between the optical component and the lens. In this variable dispersion diffraction grating, the lights output from the optical component are angular-dispersed in the direction substantially perpendicular to the direction of angular dispersion in the optical component. Therefore, by changing the angular dispersion amount, and also by rotating the lens and mirror integrally according to the diffraction angle of the variable dispersion diffraction grating, variable wavelength dispersion slope is given to the optical signals of respective wavelengths output from the optical component. Since this wavelength dispersion slope can be varied independently of the wavelength dispersion which is varied with the movement of the mirror via the slide mechanism, arbitrary wavelength dispersion and wavelength dispersion slope can be given to the lights of respective wavelengths.

According to the wavelength dispersion compensating apparatus of the present invention, since the wavelength dispersion and the wavelength dispersion slope to be given to the input light can be varied independently, it becomes possible to reliably compensate for wavelength dispersion and wavelength dispersion slope of a WDM light which has been propagated through an optical fiber to be accumulated, over a wide wavelength band.

Other objects, features, and advantages of the present invention will become apparent from the following description of the embodiments, in conjunction with the appended drawings.

DETAILED DESCRIPTION OF THE INVENTION

Figure 1:
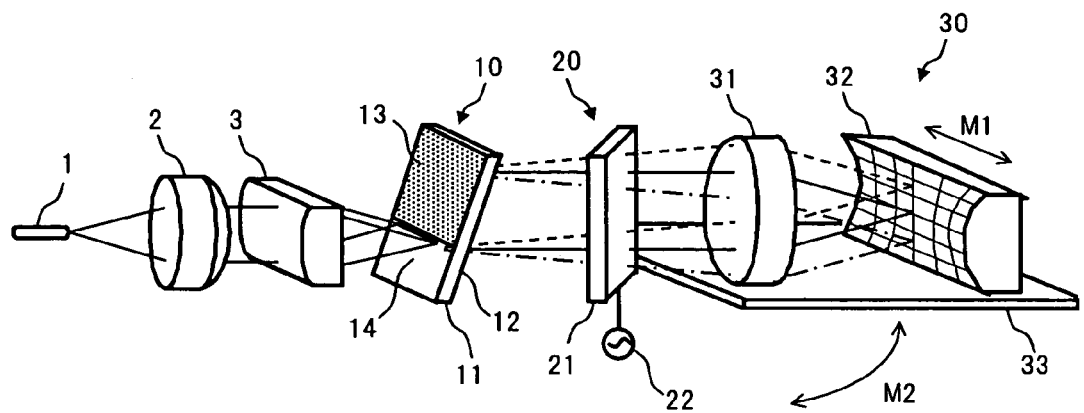
FIG. 1 is a perspective view showing a configuration of a wavelength dispersion compensating apparatus according to a first embodiment of the present invention.

There will be described embodiments for implementing a signal light interruption detecting method of the present invention and an optical amplifier using the same, with reference to the accompanying drawings. The same reference numerals denote the same or equivalent parts in all drawings.

FIG. 1 is a perspective view showing a configuration of a wavelength dispersion (chromatic dispersion) compensating apparatus according to a first embodiment of the present invention.

In FIG. 1, the wavelength dispersion compensating apparatus of the present embodiment comprises for example: a VIPA plate 10; an optical system consisting of an optical fiber 1, a collimate lens 2, and a cylindrical lens 3, which permits a WDM light condensed on one segment to be incident on a transmission area 14 of the VIPA plate 10; a variable dispersion diffraction grating 20 which is given with a light multi-reflected by the VIPA plate 10 and emitted from one of planes of the VIPA plate 10; and a light return apparatus 30 which reflects the light which has passed through the variable dispersion diffraction grating 20 and returns it to the VIPA plate 10 via the variable dispersion diffraction grating 20.

Figure 18:
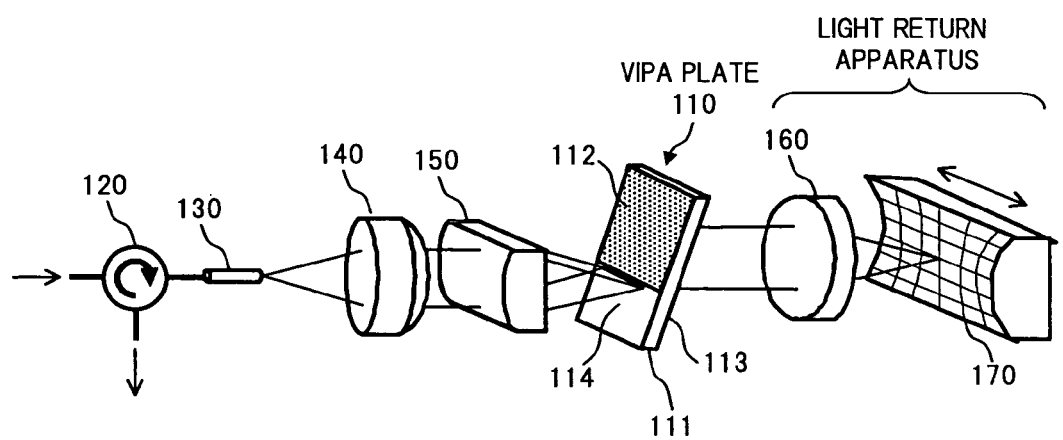
FIG. 18 is a perspective view showing a constitutional example of a configuration of a conventional VIPA-type wavelength dispersion compensating apparatus.
Figure 19:
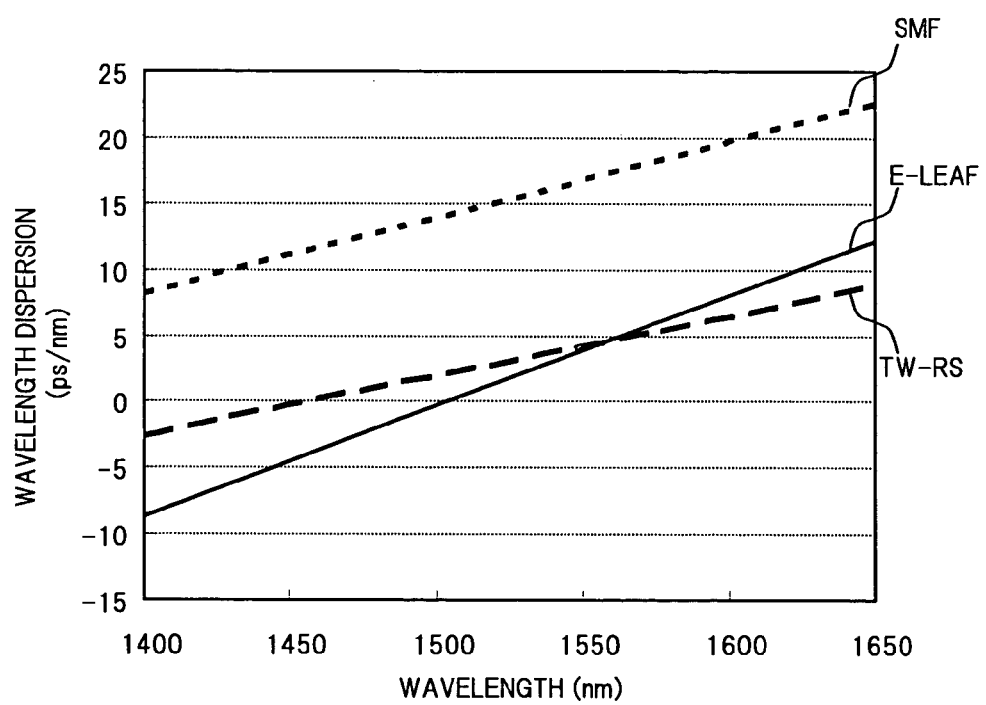
FIG. 19 is a diagram exemplarily showing wavelength dispersion and wavelength dispersion slope of various types of optical fiber.

As with the conventional configuration shown in the above described FIG. 18, the VIPA plate 10 has a transparent member 11 of a thin glass plate or the like provided with parallel planes opposed to each other, a reflective film 12 formed on one of the parallel planes of the transparent member 11, and a reflective film 13 and a transmission area 14 formed on the other parallel plane. In this VIPA plate 10, an optical axis of a light incident on the transparent area 14 is inclined to a perpendicular incident angle by a required angle. The reflective film 12 formed on the parallel pate on the opposite side to the transparent area 14 has the reflectance less than 100% (preferably approximately 98%) to the WDM light incident from the transparent area 14, and is formed over the entirety of the one plane of the transparent member 11. Moreover, the reflective film 13 opposed to the reflective film 12 has the reflectance of approximately 100% to the WDM light incident from the transparent area 14, and is formed on a part of the other plane of the transparent member 11. A part of the other plane of the transparent member 11 on which the reflective film 13 is not formed, forms the transparent area 14 transparent to the WDM light.

The optical fiber 1 is, for example, a single mode fiber or the like, with one end (omitted in the figure) connected to an optical circulator (refer to FIG. 18), and the other end positioned in the vicinity of the collimate lens 2. The collimate lens 2 is a typical lens for converting an optical beam emitted from the other end of the optical fiber 1 into parallel lights, to give the parallel lights to the cylindrical lens 3. The cylindrical lens 3 is a line focal lens which condenses the parallel lights from the collimate lens 2 onto one segment. The cylindrical lens 3 may be substituted with a line focal lens such as a refractive index distribution lens or the like.

The variable dispersion diffraction grating 20, which is disposed between the VIPA plate 10 and the light return apparatus 30, is a well-known optical device capable to disperse lights of respective wavelengths at different output angles and also capable to change the angular dispersion, in a substantially perpendicular direction to a direction of angular dispersion of the VIPA plate 10. Here, a diffraction grating utilizing, for example, an acousto-optic effect, is used as the variable dispersion diffraction grating 20. This acousto-optic type variable dispersion diffraction grating 20 is structured such that an electrode (not shown in the figure) is formed on a thin flat plate 21 made from an acousto-optic material, and a high frequency signal output from a drive power source 22 is supplied to the electrode, to generate surface acoustic waves, and a diffraction grating is formed depending on a variation of the refractive index of the material due to the surface acoustic waves. In this acousto-optic type variable dispersion diffraction grating 20, a frequency of the high frequency signal to be applied to the electrode from the drive power source 22 is changed, to change a period of the diffraction grating, thereby enabling the angular dispersion to be variable. Specifically, the higher the drive frequency from the drive power source 22 is, the shorter the period of the diffraction grating becomes and the greater the angular dispersion becomes. However, as the angular dispersion becomes greater, the diffraction angle also becomes greater. Note, the above described acousto-optic type variable dispersion diffraction grating 20 is also disclosed in Japanese Unexamined Patent Publication No. 6-50844.

The light return apparatus 30 is provided with, for example, a focusing lens 31, a three-dimensional mirror 32, and a movable stage 33. The focusing lens 31 is a typical lens for condensing a diffracted light having passed through the variable dispersion diffraction grating 20 on a single point for each wavelength. In order to arbitrarily vary the wavelength dispersion given by the present apparatus as described below, the three-dimensional mirror 32 has a three-dimensional structure in which a cross-sectional shape of a reflective surface thereof is gradually changed from a convex face to a flat face, and subsequently to a concave face, in the direction perpendicular to the direction of angular dispersion of the VIPA plate 10. The three-dimensional mirror 32 is provided with a mirror slide mechanism M1 to slide the three-dimensional mirror 32 in the direction perpendicular to the direction of angular dispersion of the VIPA plate 10. The focusing lens 31 and the three-dimensional mirror 32 (and the mirror slide mechanism M1) are mounted on the movable stage 33. This movable stage 33 is provided with a stage rotation mechanism M2 to rotate the focusing lens 31 and the three-dimensional mirror 32 integrally according to the setting of the variable dispersion diffraction grating 20. Note, the mirror slide mechanism M1 and the stage rotation mechanism M2 are described in detail below.

Next, an operation of the first embodiment will be described.

In the wavelength dispersion compensating apparatus of the above configuration, the WDM light emitted from the optical fiber 1 is converted into parallel lights by the collimate lens 2, and then condensed on one segment by the cylindrical lens 3, to be incident between the opposing parallel planes of the VIPA plate 10. This light incident on the VIPA plate 10 is multi-reflected repeatedly between the reflective films 12 and 13 formed on the parallel planes of the VIPA plate 10. At this time, every time the incident light is reflected on the reflective film 12, a few % of the light is transmitted through the reflective surface to be emitted outside the VIPA plate 110.

Figure 2:
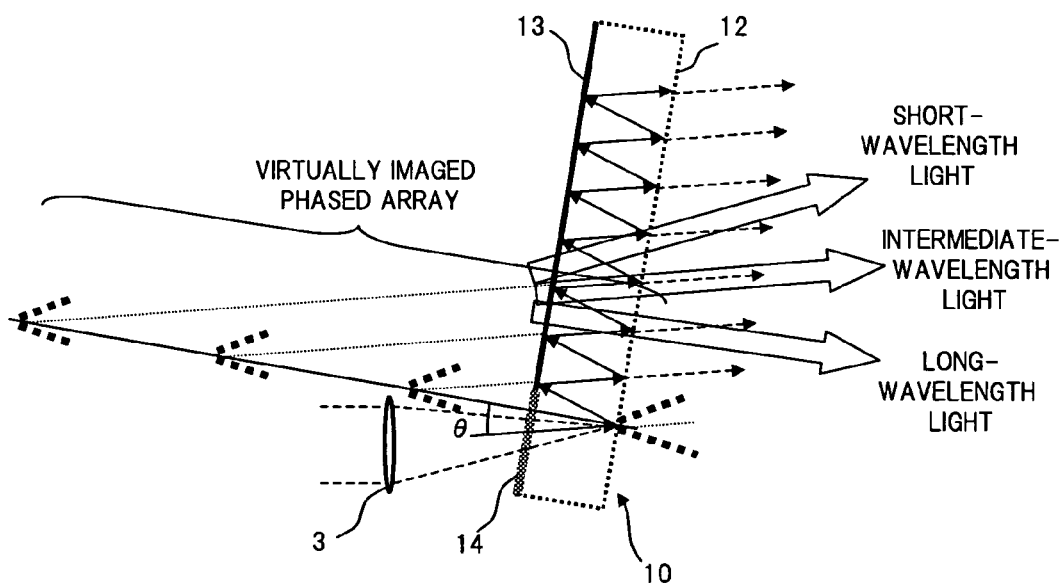
FIG. 2 is a diagram showing a model for explaining the principle of operation of a VIPA.

In consideration of a model shown in FIG. 2 for example, behavior of the light multi-reflected by the VIPA plate 10 is similar to that of an Echelon grating known as a stepped diffraction grating. Therefore, the VIPA plate 10 can be considered as a virtual diffraction grating. Further, in consideration of an interference condition in the VIPA plate 10, as shown on the right side in FIG. 2, the emitted light interferes under a condition in which with an optical axis thereof as a reference, a shorter wavelength is above the optical axis and a longer wavelength is below the optical axis, and therefore, among a plurality of optical signals contained in the WDM light, optical signals on the shorter wavelength side are emitted above the optical axis and optical signals on the longer wavelength side are emitted below the optical axis.

Figure 3:
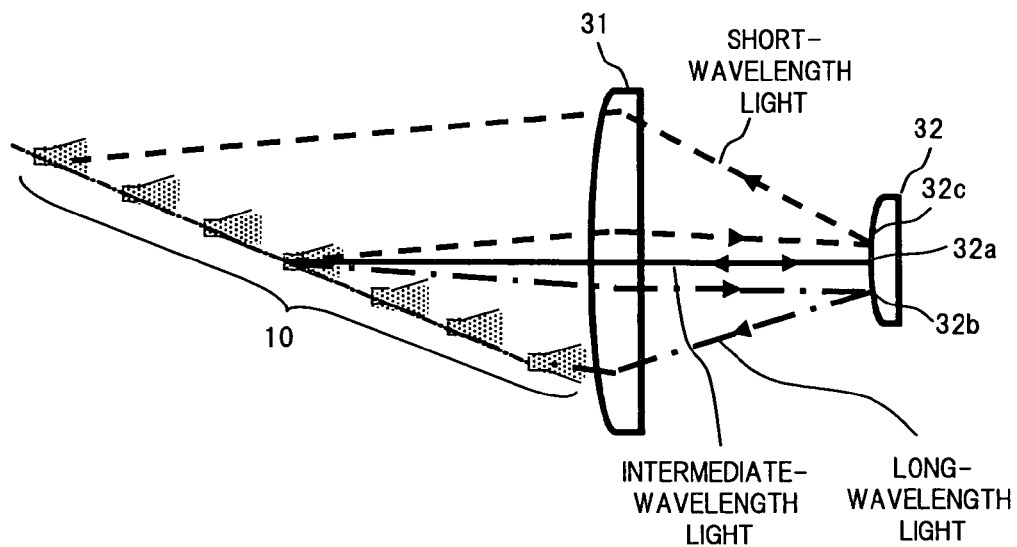
FIG. 3 is a diagram showing an example of an optical path returned by a light return apparatus.

As shown in FIG. 3 for example, the light condensed on the reflective surface of the three-dimensional mirror 32 disposed on the rear side of the focusing lens 31, is returned at a reflection angle which is determined according to the cross-sectional shape of the three-dimensional mirror 32 at a condensed position, and then output from the optical fiber 1 after passing through the focusing lens 31, the VIPA plate 10, the cylindrical lens 3, and the collimate lens 2 in this order, in a direction opposite to a path at incidence. Specifically, in the case where the cross-sectional shape of the three-dimensional mirror 32 is convex as shown in FIG. 3, the light of the short wavelength side returns to an upper side beam waist, and the optical path thereof becomes longer in comparison to that of the light of the long wavelength side, resulting in an increase of a delay. In this case, therefore, the present wavelength dispersion compensating apparatus generates negative dispersion. Conversely, while not shown in the figure, in the case where the cross-section of the three-dimensional mirror 32 is concave, positive dispersion is generated. Since the configuration of the dispersion compensation apparatus using the VIPA plate 10 in the present embodiment is such that the output light returns on the same path as the input light, as with the conventional configuration shown in the above described FIG. 18, the light input/output to/from the optical fiber 1 can be handled in-line using an optical circulator.

Here, the wavelength dispersion compensation utilizing the VIPA plate 10 will be described in detail.

Since the VIPA plate 10 used in the present embodiment is designed to satisfy the relationships of the following equations (1) and (2), in order to simultaneously compensate for wavelength dispersion of channel lights of respective wavelengths.

$$2 \cdot n \cdot t \cdot \cos\theta = m \cdot \lambda \tag{1}$$

$$FSR = c/(2 \cdot n \cdot t \cdot \cos\theta) \tag{2}$$

In the above equations, "n" represents the refractive index of the transparent member 11, "t" represents the physical thickness of the transparent member 11, θ represents an inclination angle of the VIPA plate 10 (the inclination angle to an angle of the VIPA plate 10 at which the incident light is perpendicularly incident; refer to FIG. 2), FSR represents an interval of the central wavelengths of respective channels, and "c" represents a speed of light.

Under the above condition (referred to as the "WDM matching FSR thickness" condition), since all wavelength components corresponding to the central wavelengths of the respective channels are emitted from the VIPA plate 10 at the same angle as shown in FIG. 3, the focusing lens 31 is able to condense the wavelength components corresponding to the central wavelengths of the respective channels (intermediate-wavelength light) on a point 32a on the three-dimensional mirror 32, the wavelength components corresponding to long wavelength elements of respective channels (long-wavelength light) on a point 32b on the three-dimensional mirror 32, and the wavelength components corresponding to short wavelength elements of respective channels (short-wavelength light) on a point 32c on the three-dimensional mirror 32. Therefore, the wavelength dispersion can be compensated for all channels of the WDM light using the VIPA plate 10.

For example, if the VIPA plate 10 thickness t=1 mm and the refractive index n= 1.5, all wavelengths at 100 GHz intervals satisfy the "WDM matching FSR thickness" condition (FSR=100 GHz). As a result, the VIPA plate 10 is able to give the same wavelength dispersion simultaneously to all channels of the WDM light at 100 GHz intervals.

Furthermore, a value of wavelength dispersion to be given to all channels of the above WDM light can be changed, by sliding the three-dimensional mirror 32 by the mirror slide mechanism M1. That is to say, since the cross-sectional shape of the three-dimensional mirror 32 has the three-dimensional structure in which the shape is gradually changed from the convex face to the flat face, and subsequently to the concave face, in the direction perpendicular to the direction of angular dispersion of the VIPA plate 10, by sliding this three-dimensional mirror 32 in the direction perpendicular to the direction of angular dispersion of the VIPA plate 10, it is possible to change the cross-sectional shape of the three-dimensional mirror 32 that receives the angularly dispersed lights from the VIPA plate 10 to the convex or concave shape. Thus, it is possible to give different wavelength dispersion to the WDM light according to the cross-sectional shape of the three-dimensional mirror 32. As a specific example, the mirror slide mechanism M1 can be constructed of mainly a linear slider, and a motor or the like.

As described above, by designing the thickness of the VIPA plate 10 to satisfy the "WDM matching FSR thickness" condition, it becomes possible to compensate for the wavelength dispersion simultaneously for all channels of the WDM light. And also, by sliding the three-dimensional mirror 32 by the mirror slide mechanism M1, it becomes possible to vary the wavelength dispersion. The operation described hereinabove is similar to that of the wavelength dispersion compensating apparatus using the conventional VIPA plate.

Further, as shown below, in the present embodiment, the wavelength dispersion and wavelength dispersion slope are made variable independently by the variable dispersion diffraction grating 20 and the stage rotation mechanism M2. This will be described below in detail.

Generally, for the diffraction grating, the relationship expressed in the following equation (3) is established.

$$\sin\alpha \pm \sin\beta = N \cdot m \cdot \lambda \qquad (3)$$

In the above equation, $\alpha$ represents an angle between the incident light and the normal of the diffraction grating, $\beta$ represents an angle between the diffracted light and the normal of the diffraction grating, N represents the number of grooves per 1 mm in the diffraction grating (the reciprocal of diffraction grating period "s"), "m" represents the order of diffraction (m=±1, ±2, . . . ), and $\lambda$ represents the wavelength.

With the incident angle a constant, if both sides of equation (3) are differentiated by $\lambda$, then the following equation (4) can be obtained.

$$d\beta/d\lambda = N \cdot m / \cos\beta \qquad (4)$$

In the above equation, $d\beta/d\lambda$ represents a diffraction angle change $d\beta$ to a wavelength change $d\lambda$, and is referred to as the angular dispersion (or angle dispersion). Here, for example, in order to diffract the light in the order of 1 µm in wavelength, grooves in the diffraction grating are formed in the order of 1 µm in period, and therefore, if N= 1000 and the diffracted light of m=first order is used, N·m=1000>cos$\beta$, and cos$\beta$ can be considered to be approximately constant. Therefore, if C is a constant, the above equation (4) is expressed as shown in the equation (5).

$$d\beta/d\lambda = N \cdot C \qquad (5)$$

From the equation (5), it is seen that as the number of grooves N in the diffraction grating is increased, that is to say, as the period "s" of the diffraction grating becomes smaller, the angular dispersion becomes larger.

If the equation (3) is transformed, the following equation (6) is established.

$$\beta = \sin^{-1}(|N \cdot m \cdot \lambda - \sin\alpha|) \qquad (6)$$

From the equation (6), it is necessary to pay an attention to the fact that when the incident angle $\alpha$ is made constant, the number of grooves N in the diffraction grating is increased, that is to say, the diffraction angle $\beta$ becomes larger as the period "s" of the diffraction grating becomes smaller.

Figure 4:
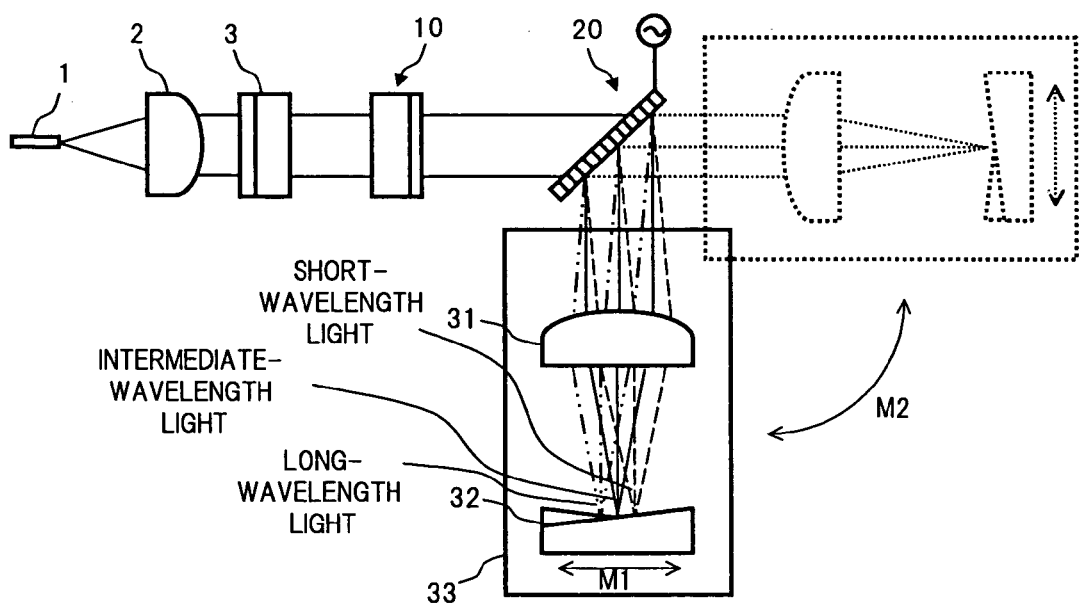
FIG. 4 is a top plan view of the configuration shown in FIG. 1.

In the present embodiment, as described above, the diffraction grating utilizing the acousto-optic effect is used as the variable dispersion diffraction grating 20. In such an acousto-optic type variable dispersion diffraction grating 20, in the case where the high frequency signal is not supplied to the electrode, that is to say, when the dispersion of the diffraction grating becomes zero, as shown by the dotted line in a top plan view of FIG. 4 when viewing the configuration in FIG. 1 from above for example, the channel lights of respective wavelengths are condensed on the same position on the reflective surface of the three-dimensional mirror 32. This condition is similar to that in the conventional configuration shown in FIG. 18.

Here, if the high frequency signal is supplied to the electrode of the acousto-optic-type variable dispersion diffraction grating 20, to generate the angular dispersion with the diffraction grating, output angles of the channel lights of respective wavelengths differ from each other in the direction substantially perpendicular (horizontal direction in the perspective view in FIG. 1) to the direction of angular dispersion in the VIPA plate 10 (vertical direction in the perspective view in FIG. 1). Therefore, as shown by the solid line in FIG. 4, the positions of the channel lights condensed on the reflective surface of the three-dimensional mirror 32 via the focusing lens 31 are displaced in transverse. At this time, centerline directions of optical beams obtained by condensing the channel lights of respective wavelengths are respectively bent by the focusing lens 31, to be the same in all channel lights. Specifically, among the channel lights of respective wavelengths contained in the WDM light, the channel lights of intermediate wavelengths are condensed on a position as shown by the solid line in FIG. 4, while the channel lights of short wavelengths are condensed on a position displaced to the right as shown by the broken line in FIG. 4, and the channel lights of longer wavelengths are condensed on a position displaced to the left as shown by the double-dashed line in FIG. 4. The displacement in transverse of the position on which the lights are condensed on the reflective surface of the three-dimensional mirror 32 in this manner implies that the different wavelength dispersion is given for each channel light of each wavelength, and means that the wavelength dispersion slope occurs. Moreover, the angular dispersion in the variable dispersion diffraction grating 20 can be varied, by changing the frequency of the drive signal for the acousto-optic type variable dispersion diffraction grating 20. Thus, becomes possible to change an amount of transverse displacement of each channel light of each channel condensed on the reflective surface of the three-dimensional mirror 32, and also to vary the wavelength dispersion slope.

However, as described above, with an increase of the angular dispersion in the variable dispersion diffraction grating 20, the diffraction angle in the variable dispersion diffraction grating 20 is also increased, so the optical paths through which the channel lights are propagated, are also greatly displaced. Therefore, it is necessary to rotate the focusing lens 31 and the three-dimensional mirror 32 integrally about a reference point O on the diffraction grating 20 according to the optical path (diffraction angle) as shown in an enlarged view in FIG. 5. In the present embodiment, therefore, the stage rotation mechanism M2 is provided to rotate the movable stage 33 on which the focusing lens 31 and the three-dimensional mirror 32 (and the mirror slide mechanism M1) are mounted, according to the frequency of the high frequency signal given to the variable dispersion diffraction grating 20. The reference point O on the diffraction grating 20 corresponds to a central position at which the power distribution of the WDM light incident on the diffraction grating 20 from the VIPA plate 10 becomes a maximum.

Summarizing the operation of the present embodiment as described above, in the case where the wavelength dispersion slope is varied by the present wavelength dispersion apparatus, the configuration may be such that the drive frequency for the acousto-optic type variable dispersion diffraction grating 20 is changed, to vary the angular dispersion in a transverse direction, and also the movable stage 33 is rotated to an optimum position by the stage rotation mechanism M2 according to the diffraction angle changed by the variable dispersion diffraction grating 20. Furthermore, in order to change the wavelength dispersion value while holding the wavelength dispersion slope, the three-dimensional mirror 32 may be slid by the mirror slide mechanism M1 as in the conventional case, with the drive frequency for the variable dispersion diffraction grating 20 and the position of the movable stage 33 unchanged. As a result, in the present embodiment, it becomes possible to vary the wavelength dispersion and the wavelength dispersion slope independently.

Figure 5:
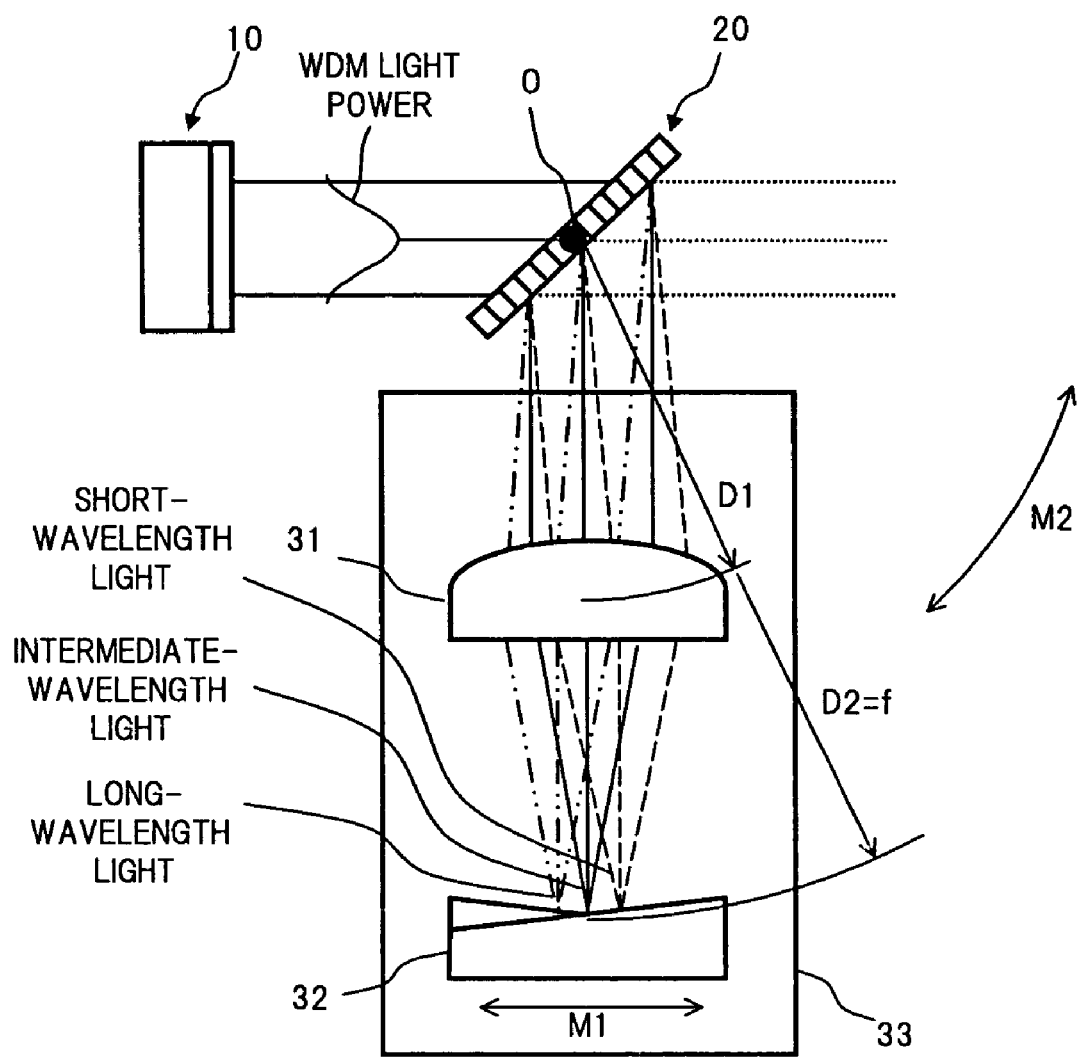
FIG. 5 is a diagram showing an enlarged view of a portion in the vicinity of the variable dispersion diffraction grating and the light return apparatus in FIG. 4.

Moreover, in the configuration of the present embodiment, as shown in FIG. 5, for example, in the case where the centerline of the beam having passed through the focusing lens 31 is not incident approximately perpendicularly on the reflective surface of the three-dimensional mirror 32, the reflected beam is displaced in transverse, and accordingly, a loss occurs. In order to suppress such a loss to be a minimum, it is desirable design an optical system such that a distance D1 from the variable dispersion diffraction grating 20 to the focusing lens 31 is approximately equal to a distance D2 from the focusing lens 31 to the three-dimensional mirror 32 (D1≈D2=f), that is, is approximately equal to a focal distance f of the focusing lens 31.

Figure 6:
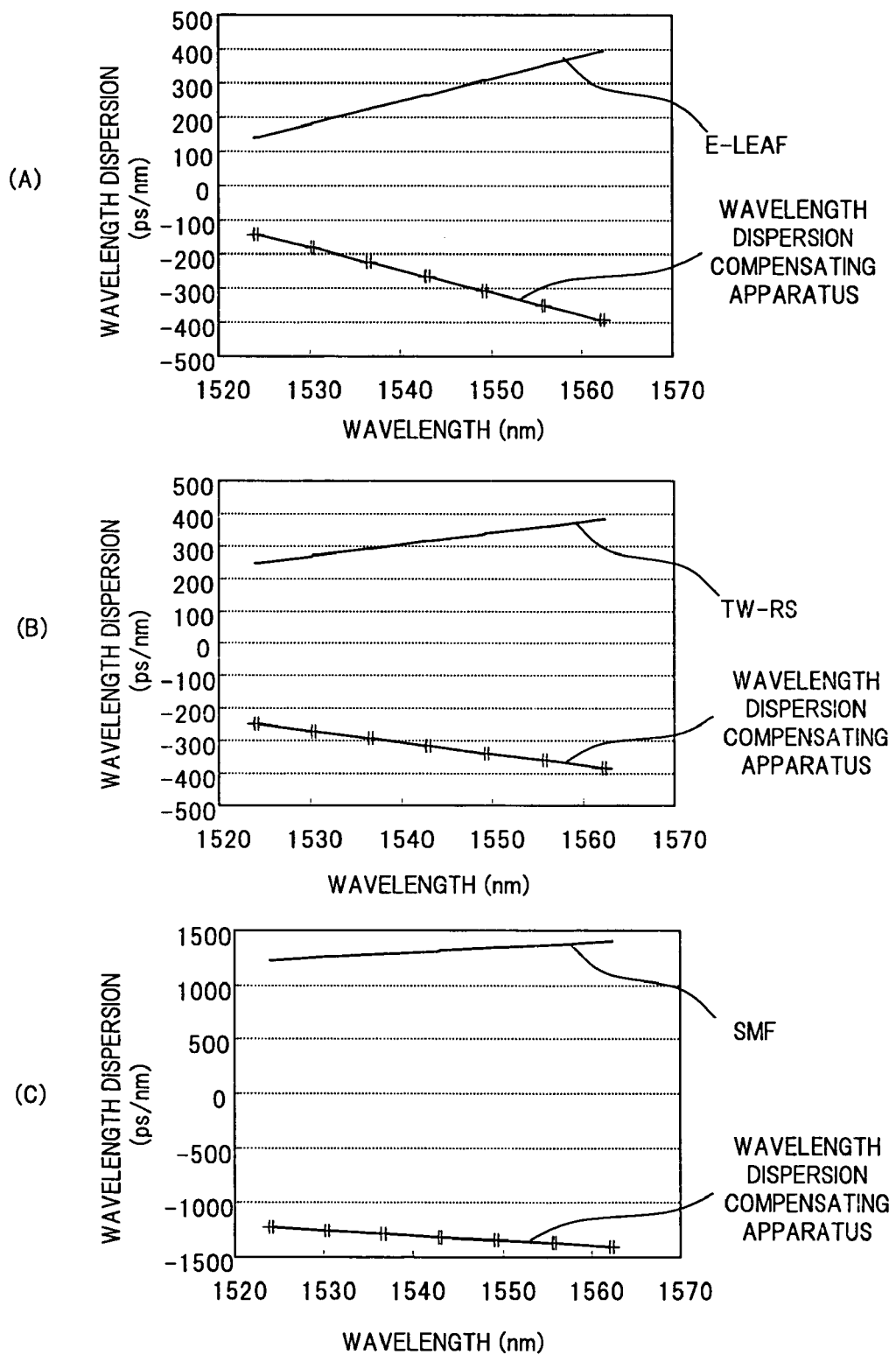
FIG. 6 is a diagram showing an example of wavelength dispersion and wavelength dispersion slope realized by the wavelength dispersion compensating apparatus of the first embodiment.

An example of the wavelength dispersion and the wavelength dispersion slope realized by the wavelength dispersion compensating apparatus of the above present embodiment is shown in FIG. 6. Here, for example, for three types of optical path fiber; E-LEAF shown in (A) (manufactured by Corning Inc.: dispersion; 3.852 ps/nm/km, dispersion slope; 0.083 ps/nm$^2$/km), TW-RS shown in (B) (manufactured by Lucent Inc.: dispersion; 4.219 ps/nm/km, dispersion slope; 0.045 ps/nm$^2$/km), and SMF shown in (C) (dispersion; 16.79 ps/nm/km, dispersion slope; 0.057 ps/nm$^2$/km), there is shown results of optimization of the wavelength dispersion compensating apparatus so that the wavelength dispersion and the wavelength dispersion slope occurring in the case of assuming that each transmission distance is 80 km, are capable to be compensated. As a result, it is understood that wavelength dispersion and wavelength dispersion slope completely opposite to the wavelength dispersion and the wavelength dispersion slope in different types of optical fiber can be realized by the present wavelength dispersion compensating apparatus. Consequently, if the present wavelength dispersion compensating apparatus optimized according to the type of optical fiber used for the transmission path is used for the transmission of the WDM light, it becomes possible to obtain a satisfactory eye-opening for received waveform of the channel light of each waveform, even in the case of the transmission of WDM light at ultra-high speed at 40 Gbits/second or the like.

A second embodiment of the present invention will be described.

Figure 7:
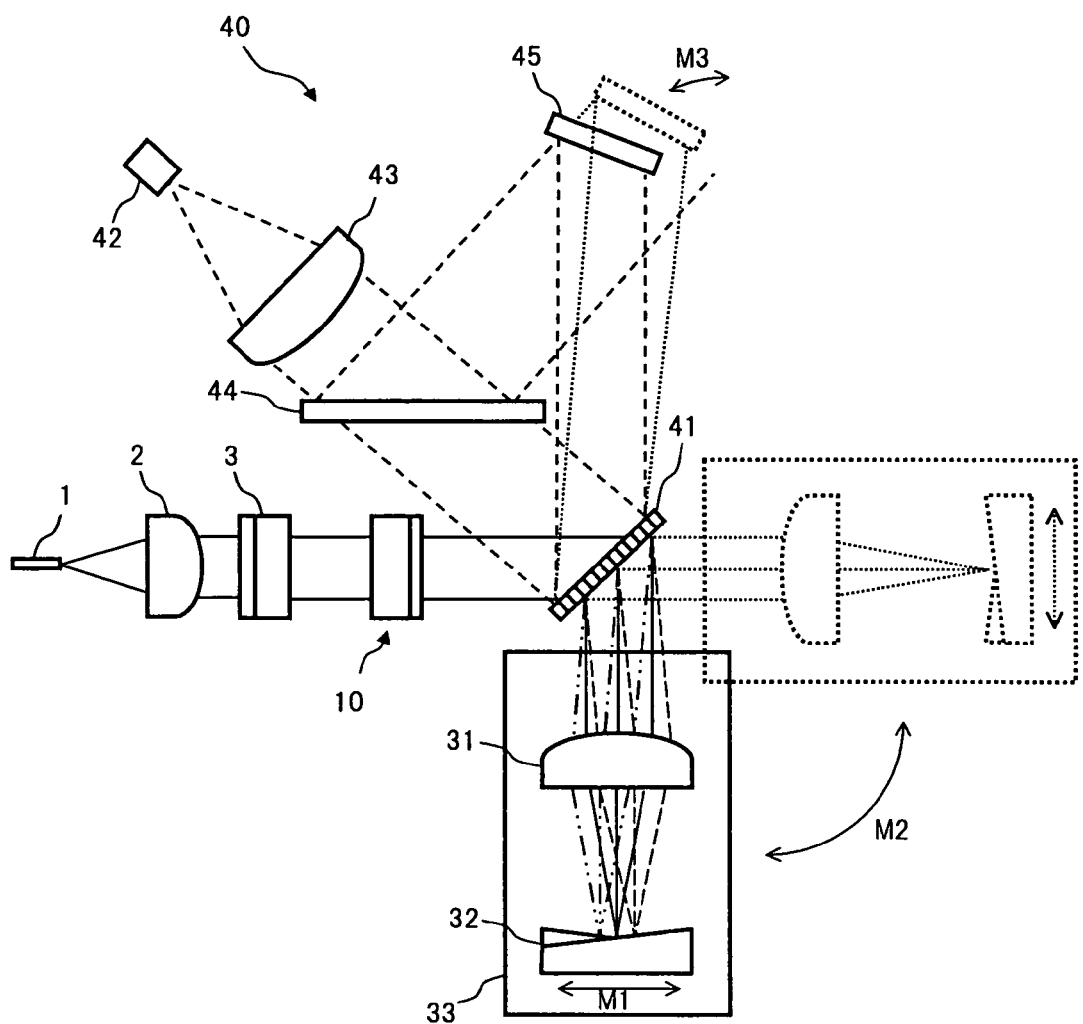
FIG. 7 is a top plan view showing a configuration of a wavelength dispersion compensating apparatus according to a second embodiment of the present invention.

FIG. 7 is a top plan view showing a configuration of a wavelength dispersion compensating apparatus of the second embodiment.

In FIG. 7, the configuration of the present embodiment differs from that of the first embodiment in that a photo-refractive type variable dispersion diffraction grating 40 is provided in place of the acousto-optic type variable dispersion diffraction grating 20 used in the first embodiment. Other components are similar to those in the first embodiment.

The photo-refractive type of variable dispersion diffraction grating 40 is a well-known diffraction grating disclosed in Japanese Unexamined Patent Publication No. 2001-324731. That is to say, the photo-refractive type diffraction grating is configured such that interference infringes are formed on a surface of a thin plate 41 of a photo-refractive material, with a wavelength control laser light which is efficiently absorbed by the photo-refractive material, to form a diffracting grating depending on a variation of refractive index of the photo-refractive material occurring according to the optical intensity of these interference fringes. As shown in FIG. 7, a twin-beam interferometer or the like can be utilized in order to form the interference fringes. In this twin-beam interferometer, output lights from a light source 42 are made parallel lights by a collimate lens 43, to be branched into two optical paths by a half mirror 44, and one of the optical paths is returned by a half mirror 45 to have a difference from the other optical path, and then, the two optical paths are recombined to form the interference fringes.

Here, the spacing (period) "s" of the interference fringes can be expressed by the following equation (7), where γ represents an intersection angle of the two optical paths, and λ represents a wavelength of the output from the light source 42.

$$s=\lambda/\sin\gamma \qquad (7)$$

As is seen from the equation (7), the period "s" of the interference fringes can be changed by the wavelength λ and the intersection angle γ of the two optical paths, and in order to reduce the period "s" of the interference fringes (that is to say, in order to increase the number of grooves), the wavelength λ may be shortened, or the intersection angle γ of the two optical paths may be increased. In order to change the wavelength λ in practice, a variable wavelength laser light source may be used as the light source 42, for example. Furthermore, in order to change the intersection angle γ of the two optical paths, the mirror 45 of the one optical path may be rotated to move by the mirror rotation mechanism M3 to change an emission angle of the reflected light from the mirror 45, as shown by the dotted line in FIG. 7.

In this manner, in the photo-refractive type variable dispersion diffraction grating 40, the period "s" of the diffraction grating can be changed to make the angular dispersion variable, by changing the wavelength λ of the light source 42 in the twin-beam interferometer, or by rotating to move the mirror 45 to change the intersection angle γ of the two optical paths. As described above, as the wavelength λ becomes shorter, or as the intersection angle of the two optical paths γ becomes greater, the period "s" of the diffraction grating is reduced and the angular dispersion is increased. However, for a same reason as with the first embodiment, as the angular dispersion in the variable dispersion diffraction grating 40 becomes greater, a diffraction angle also becomes greater, and propagation directions of channel lights of respective wavelengths output from the variable dispersion diffraction grating 40 are also greatly displaced. As with the first embodiment, therefore, it is necessary to rotate the movable stage 33 by the stage rotation mechanism M2 according to the diffraction angle in the variable dispersion diffraction grating 40.

Accordingly, in the present wavelength dispersion compensating apparatus, to change the wavelength dispersion slope, the angular dispersion of the photo-refractive type variable dispersion diffraction grating 40 may be varied by changing the wavelength λ of the light source 42 in the twin-beam interferometer, or by rotating to move the mirror 45 to change the intersection angle γ of the two optical paths, and also the movable stage 33 may be rotated to an optimum position by the stage rotation mechanism 27 according to the diffraction angle in the variable dispersion diffraction grating 40. Furthermore, in order to change the wavelength dispersion value while holding the wavelength dispersion slope, the three-dimensional mirror 32 is slid by the mirror slide mechanism M1 as in the conventional case, with the setting of the twin-beam interferometer and the position of the stage 33 unchanged.

As described above, also in the wavelength dispersion compensating apparatus of the second embodiment using the photo-refractive type variable dispersion diffraction grating 40, the wavelength dispersion and the wavelength dispersion slope can also be varied independently, and a similar effect to that in the first embodiment can be obtained.

A third embodiment of the present invention will be described.

Figure 8:
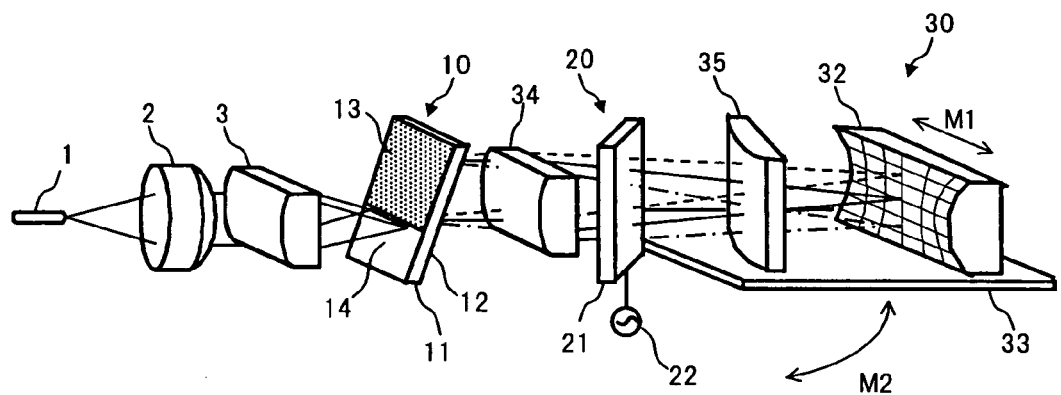
FIG. 8 is a perspective view showing a configuration of a wavelength dispersion compensating apparatus according to a third embodiment of the present invention.

FIG. 8 is a perspective view showing a configuration of a wavelength dispersion compensating apparatus according to the third embodiment of the present invention. Moreover, FIG. 9 is a top plan view when viewing the configuration shown in FIG. 8 from above.

Figure 9:
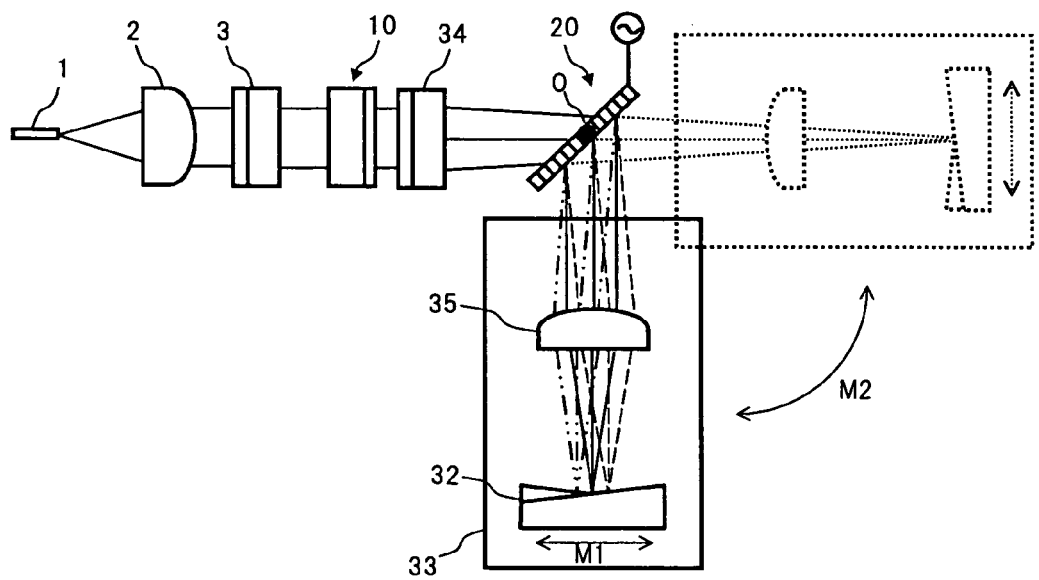
FIG. 9 is a top plan view of the configuration shown in FIG. 8.

In FIG. 8 and FIG. 9, the configuration of the present embodiment differs from that of the first embodiment in that two cylindrical lenses 34 and 35 are provided in place of the single focusing lens 31 which has condensed the output light from the VIPA plate 10 on the reflective surface of the three-dimensional mirror 32 in the first embodiment. Other components are similar to those of the first embodiment.

The cylindrical lens 34 is a line focal lens, which is disposed, for example, between the VIPA plate 10 and the variable dispersion diffraction grating 20, and condenses the output light from the VIPA plate 10 into the same direction as the direction of angular dispersion (a direction perpendicular to the paper in the top plan view in FIG. 9) in the VIPA plate 10. On the other hand, the cylindrical lens 35 is a line focal lens, which is mounted on the movable stage 33 between the variable dispersion diffraction grating 20 and the three-dimensional mirror 32, and condenses the output light from the variable dispersion diffraction grating 20 in the same direction as the direction of angular dispersion in the variable dispersion diffraction grating 20 (direction parallel to the paper in the top plan view in FIG. 9). Here, the cylindrical lens 34 is referred to as a "vertical cylindrical lens", and the cylindrical lens 35 is referred to as a "horizontal cylindrical lens" corresponding to their condensing direction.

In the configuration of the aforementioned first embodiment, the occurrence of loss is suppressed to a minimum by making the distance D1 from the variable dispersion diffraction grating 20 to the focusing lens 31, and the distance D2 from the focusing lens 31 to the three-dimensional mirror 32 (that is to say, the focal distance f), approximately equal to each other. In this case, if the focal distance f of the focusing lens 31 is lengthened, the size of the wavelength dispersion compensating apparatus becomes greater. On the other hand, in the case where the focal distance f of the focusing lens 31 is made shorter, to reduce the size of the wavelength dispersion compensating apparatus, it is necessary to make the concavity and convexity of the reflective surface of the three-dimensional mirror 32 to be greater, to ensure that the amount of wavelength dispersion occurring in the VIPA plate 10 is approximately equal to that prior to the reduction of the focal distance f of the focusing lens 31, resulting in a problem that such a three-dimensional mirror 32 is not readily manufactured.

In order to resolve this problem, in the configuration of the present embodiment, it is possible to extend the distance between the vertical cylindrical lens 34, which has an affect on the shape of the reflective surface of the three-dimensional mirror 32, and the three-dimensional mirror 32, without increasing the size of the wavelength dispersion compensating apparatus. The variable dispersion diffraction grating 20 and the horizontal cylindrical lens 35 are disposed so that the distance from the variable dispersion diffraction grating 20 to the horizontal cylindrical lens 35, and the distance from the horizontal cylindrical lens 35 to the three-dimensional mirror 32, are approximately equal to each other, on the optical path between the vertical cylindrical lens 34 and the three-dimensional mirror 32. Then, the movable stage on which the horizontal cylindrical lens 35 and the three-dimensional mirror 32 (and the mirror slide mechanism M1) are mounted, is rotated to the optimum position by the stage rotation mechanism M2 about the reference point O of the variable dispersion diffraction grating 20, according to the diffraction angle in the variable dispersion diffraction grating 20. Thus, similar function and effect to those in the first embodiment can be achieved, and also it becomes possible to miniaturize the wavelength dispersion compensating apparatus.

Figure 10:
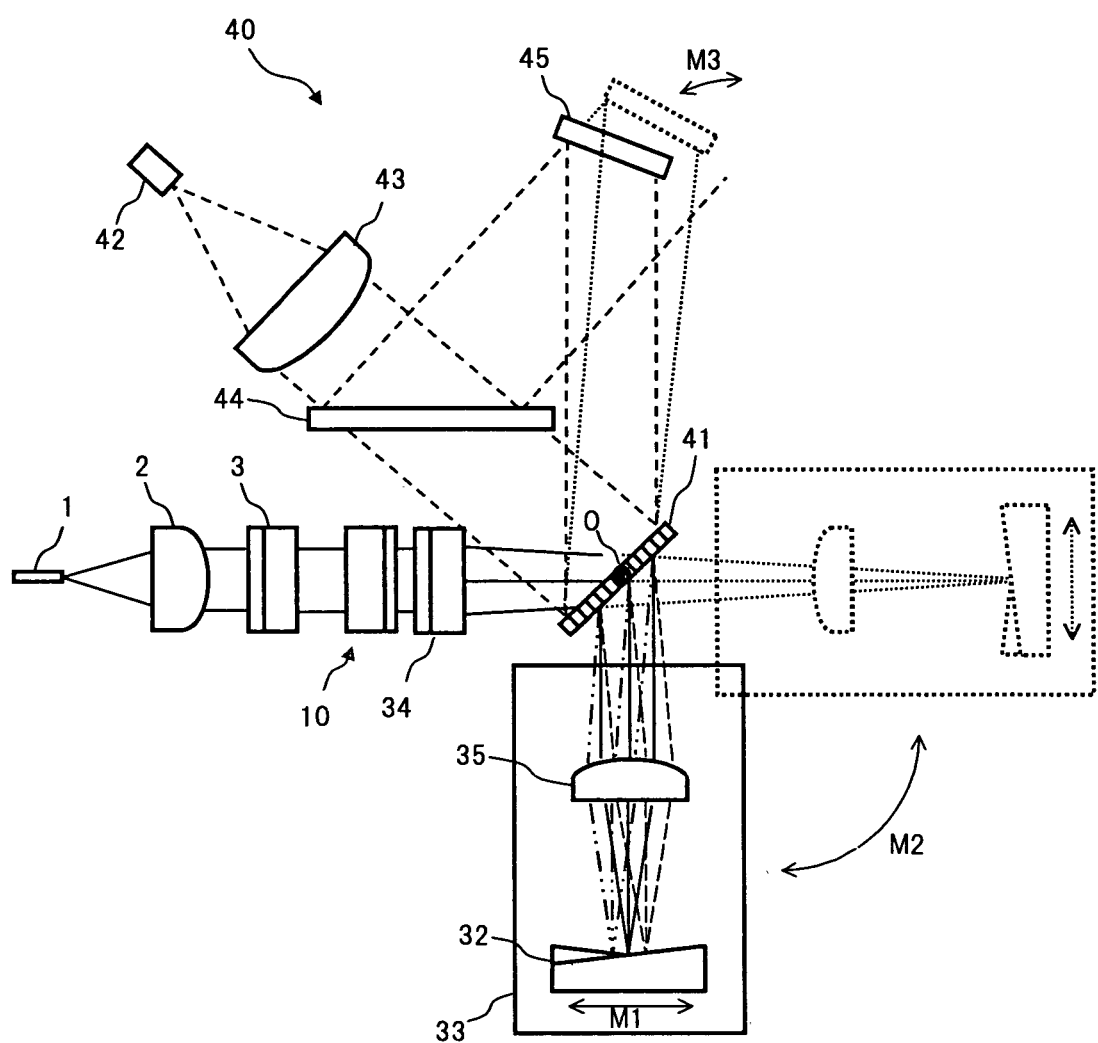
FIG. 10 is a top plan view showing a constitutional example in the case where a photo-refractive type variable dispersion diffraction grating is used in the third embodiment.

The above third embodiment shows an example in which the vertical cylindrical lens 34 and the horizontal cylindrical lens 35 are used in the configuration of the first embodiment using the acousto-optic type variable dispersion diffraction grating 20. In a similar manner, it is also possible to use the vertical cylindrical lens 34 and the horizontal cylindrical lens 35 in the configuration of the second embodiment using the photo-refractive type variable dispersion diffraction grating 40. A top plan view in FIG. 10 shows a constitutional example of the wavelength dispersion compensating apparatus in this case.

A fourth embodiment of the present invention will be described.

Figure 11:
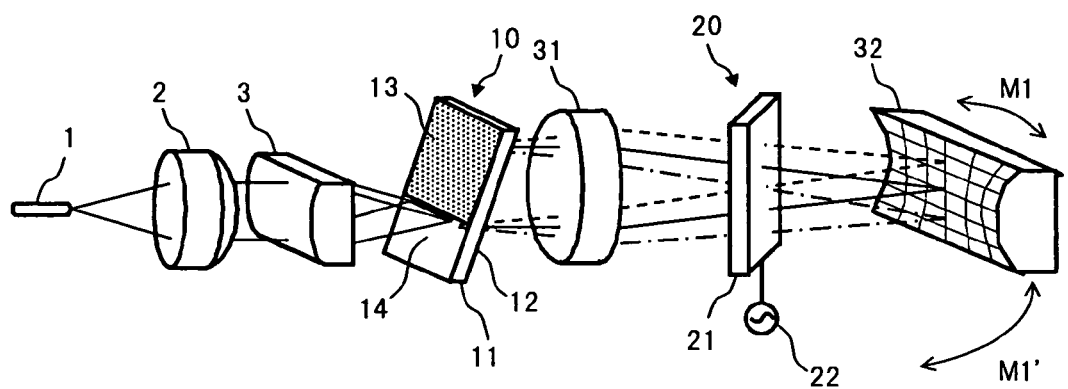
FIG. 11 is a perspective view showing a configuration of a wavelength dispersion compensating apparatus according to a fourth embodiment of the present invention.
Figure 12:
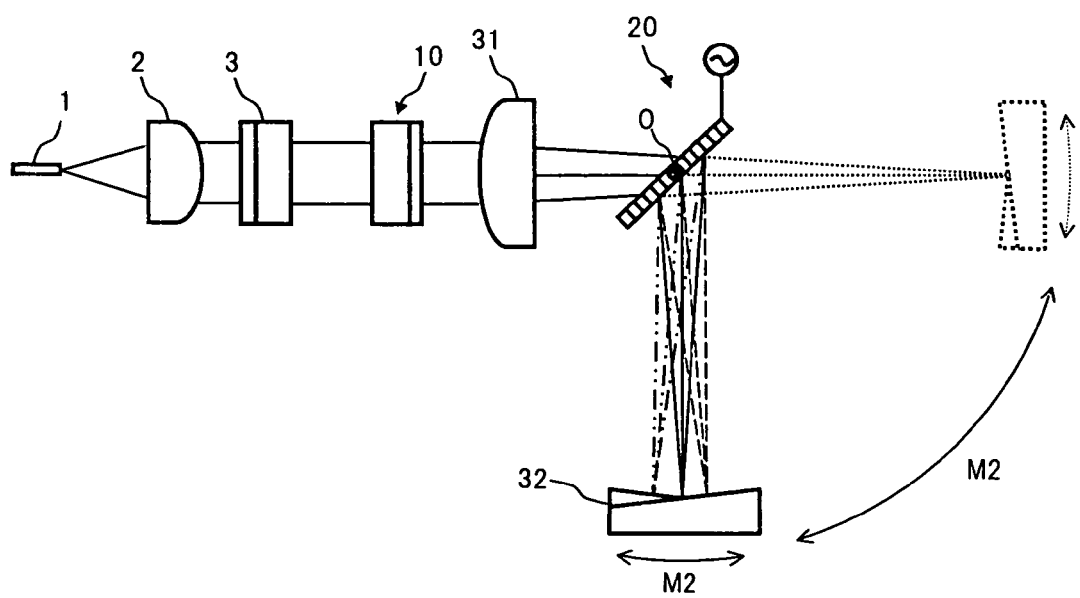
FIG. 12 is a top plan view of the configuration shown in FIG. 11.

FIG. 11 is a perspective view showing a configuration of a wavelength dispersion compensating apparatus of the fourth embodiment of the present invention. FIG. 12 is a top plan view when viewing the configuration in FIG. 11 from above.

As shown in the figures, the wavelength dispersion compensating apparatus of the present embodiment is an application example in which, for example, in the configuration of the first embodiment, the positioning of the variable dispersion diffraction grating 20 is changed from the position between the VIPA plate 10 and the focusing lens 31, to the position between the focusing lens 31 and the three-dimensional mirror 32, and the reflective surface of the three-dimensional mirror 32 is curved as described below, so that the mirror slide mechanism M1 and the stage rotation mechanism M2 can be common. Other components are similar to those of the first embodiment.

In the wavelength dispersion compensating apparatus of the above configuration, the channel lights of respective wavelengths output from the VIPA plate 10 are angularly dispersed in the direction perpendicular to the direction of angular dispersion in the VIPA plate 10 by the variable dispersion diffraction grating 20, before being condensed on the reflective surface of the three-dimensional mirror 32 by the focusing lens 31, and thus the position on which the lights are condensed on the reflective surface of the three-dimensional mirror 32 is displaced according to wavelengths in a transverse direction in the top plan view in FIG. 12. Furthermore, at the same time, the centerline directions (angles) of focused beams of respective wavelengths differ from each other according to respective wavelengths. Therefore, if the consideration is made on the case of using the three-dimensional mirror 32 having a reflective surface shape similar to that in the first embodiment, there occur wavelengths at which the centerlines of the focused beams are not incident perpendicularly on the reflective surface of the three-dimensional mirror 32, so that, at these wavelengths, the reflected beams are displaced in transverse to occur losses. That is to say, the wavelength dependence of the losses occurs.

In the present embodiment, therefore, the shape of the entire reflective surface is curved so that the three-dimensional mirror 32 is concaved along an arc, which is centered on the reference point O of the variable dispersion diffraction grating 20 and passes through the center of the reflective surface (a face averaging the concave-convex shape). Thus, even if the angular dispersion occurs in the variable dispersion diffraction grating 20, and the centerline directions (angles) of the focused beams of respective wavelengths differ from each other according to wavelengths, since each focused beam is incident approximately perpendicularly on the reflective surface of the three-dimensional mirror 32, the reflected beam is not displaced in transverse, and also a loss does not occur, so that the wavelength dependence of the loss does not occur.

In the case where the three-dimensional mirror 32 whose entire reflective surface having a concave-convex shape is curved in a concave shape, is used, in order to vary the wavelength dispersion, it is necessary to rotate the three-dimensional mirror 32 along the arc, which is centered on the reference point O of the variable dispersion diffraction grating 20 and passes through the center of the reflective surface, and not to slide the three-dimensional mirror 32 in a straight line as in the first embodiment. Moreover, also in the case where the wavelength dispersion slope is varied, it is necessary to rotate the three-dimensional mirror 32 to the optimum position according to a change in the diffraction angle in the variable dispersion diffraction grating 20. However, since this rotation is also the rotation along an arc, which is centered on the reference point O of the variable dispersion diffraction grating 20 and passes through the center of the reflective surface of the three-dimensional mirror 32, the rotation operation is exactly the same as the case where the wavelength dispersion is varied. Accordingly, it becomes possible to vary the wavelength dispersion and wavelength dispersion slope independently utilizing the common stage rotation mechanism M2. Thus, the configuration of the wavelength dispersion compensating apparatus can be simplified, miniaturized, and reduced in cost.

Figure 13:
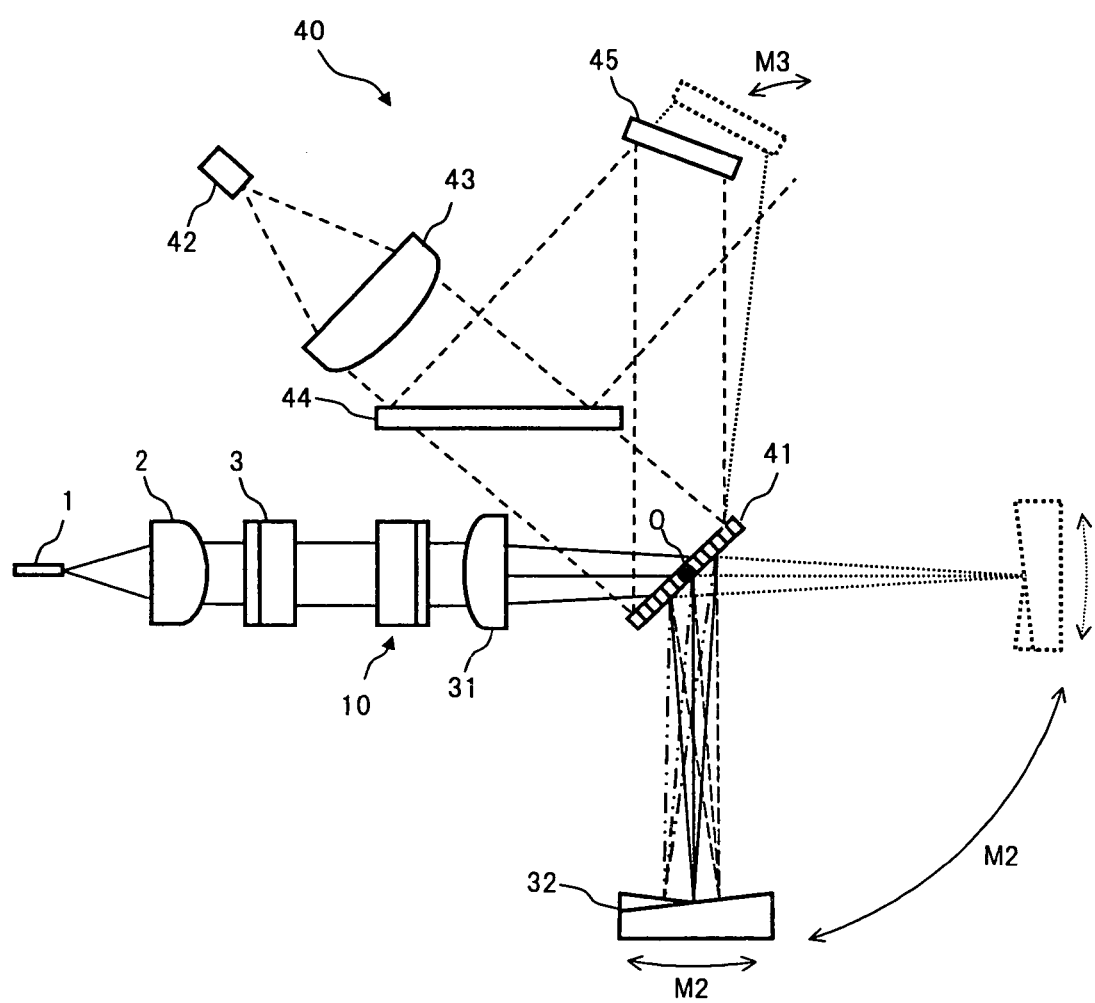
FIG. 13 is a top plan view showing a constitutional example in the case where the photo-refractive variable dispersion diffraction grating is used in the fourth embodiment.

In the above fourth embodiment, the mirror slide mechanism M1 and the stage rotation mechanism M2 are commonly used in the configuration of the first embodiment using the acousto-optic type variable dispersion diffraction grating 20. In a similar manner, is possible to use commonly the mirror slide mechanism M1 and the stage rotation mechanism M2 in the configuration of the second embodiment using the photo-refractive type variable dispersion diffraction grating 40. A top plan view in FIG. 13 shows a constitutional example of the wavelength dispersion compensating apparatus in this case.

A fifth embodiment of the present invention will be described.

Figure 14:
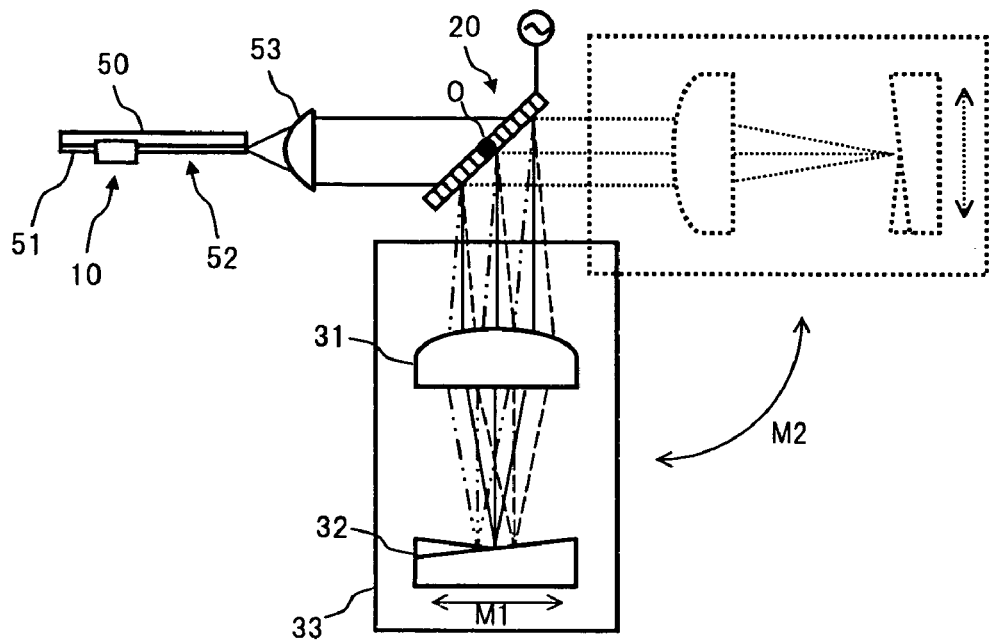
FIG. 14 is a top plan view showing a configuration of a wavelength dispersion compensating apparatus according to a fifth embodiment of the present invention.
Figure 15:
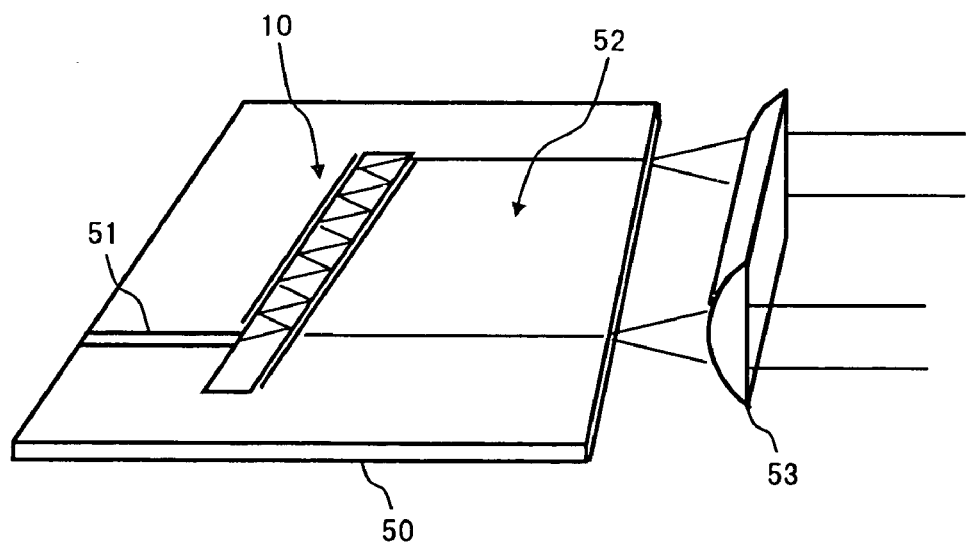
FIG. 15 is a perspective view showing a configuration of a waveguide-type VIPA plate in the fifth embodiment.

FIG. 14 is a top plan view showing a configuration of a wavelength dispersion compensating apparatus of the fifth embodiment of the present invention. Furthermore, FIG. 15 is a perspective view showing a configuration of a waveguide type VIPA plate used in the configuration in FIG. 14.

As shown in the figures, in the wavelength dispersion compensating apparatus of the present embodiment, the bulk type configuration of the VIPA plate 10 is replaced with a waveguide type configuration. Specifically, the optical fiber 1, the collimate lens 2, and the cylindrical lens 3 for guiding the WDM light to the VIPA plate 10 in the first embodiment are replaced by a single waveguide 52 formed on a substrate 50. The VIPA plate 10 is then disposed on the substrate 50, which is positioned on an end portion of the waveguide 52. The configuration of the VIPA plate 10 disposed on the substrate 50 is similar to the bulk type VIPA plate 10 used in the first embodiment. The lights multi-reflected by the VIPA plate 10 are propagated through the slab waveguide 52 formed on the surface of the substrate 50, to interfere with each other, and are emitted from an end face of the substrate 50 at different angles for each wavelength. The lights emitted from the substrate 50 pass through the cylindrical lens 53, to become parallel lights angularly dispersed in the direction parallel to the surface of the substrate 50. The light of each wavelength output from this cylindrical lens 53 becomes the same condition as that of the light output from the bulk type VIPA plate 10 in the first embodiment, and is given to the variable dispersion diffraction grating 20, to be angularly dispersed in a direction substantially perpendicular to the surface of the substrate 50, and subsequently, in a manner similar to the first embodiment, the light is condensed by the focusing lens 31 to be reflected by the three-dimensional mirror 32. Thus, similar function and effect to those in the first embodiment can be achieved even by the wavelength dispersion compensating apparatus using the waveguide type VIPA plate 10.

A sixth embodiment of the present invention will be described.

Figure 16:
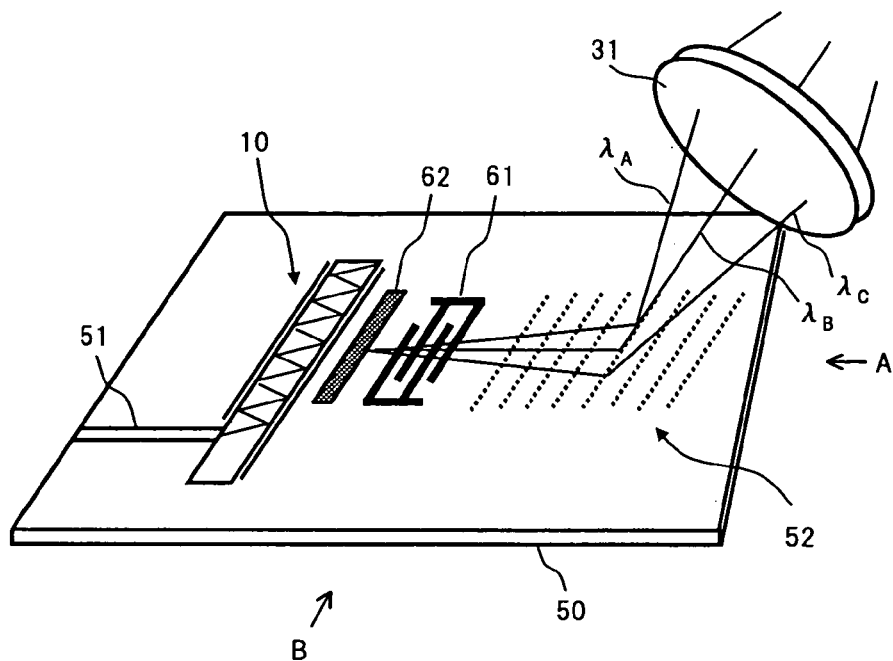
FIG. 16 is a perspective view showing configurations of a waveguide-type VIPA plate and a variable dispersion diffraction grating used in a wavelength dispersion compensating apparatus according to a sixth embodiment of the present invention.

FIG. 16 is a perspective view showing a configuration of a waveguide type VIPA plate and variable dispersion diffraction grating used in a wavelength dispersion compensating apparatus of the sixth embodiment of the present invention.

As shown in FIG. 16, the wavelength dispersion compensating apparatus of the present embodiment is an application example in which the variable dispersion diffraction grating 20 is also formed on the substrate 50 on which the VIPA plate 10 is formed, in the configuration of the above fifth embodiment. Specifically, a material having an acousto-optic effect is used for the substrate 50, and an interdigital transducer 61 is disposed on the portion where the slab waveguide 52 is formed in the surface of the substrate 50. Then, a high frequency signal output from a drive power source (not shown in figures) is supplied to the interdigital transducer 61, to generate a surface acoustic wave, so that a diffraction grating is formed on the slab waveguide 52 depending on a variation of the refractive index of the material due to the surface acoustic wave. Note, it is preferable that an absorbent body 62 is disposed between the VIPA plate 10 and the interdigital transducer 61 for preventing the propagation of the surface acoustic wave to the VIPA plate 10 side.

Figure 17:
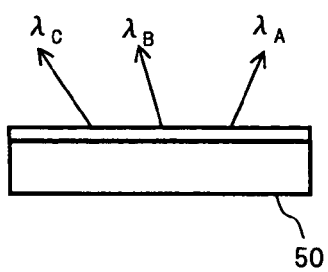
FIG. 17 is a diagram exemplarily showing a state of channel light output from a surface of a substrate in the sixth embodiment.
Figure 17:
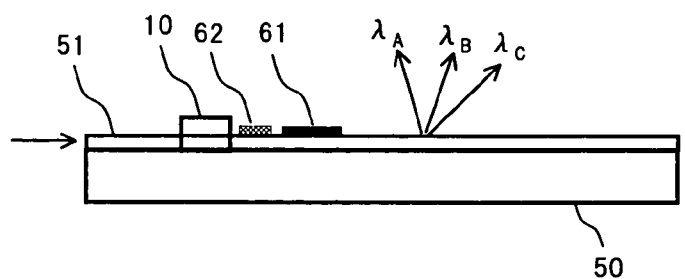

In the above configuration, the channel lights of respective wavelengths, which have been emitted from the VIPA plate 10 and angularly dispersed, are output from the surface of the substrate 50 at different angles for each wavelength by the diffraction grating due to the acousto-optic effect. FIG. 17 is a diagram exemplarily showing states of channel lights of wavelengths $\lambda_A$ through $\lambda_c$ output from the surface of the substrate 50, in which (A) is a side view of the substrate 50 when viewing from a direction A of FIG. 16, and (B) is a side view of the substrate 50 when viewing from a direction B of FIG. 16. In this manner, the channel lights of respective wavelengths which have been angularly dispersed in a direction parallel to the surface of the substrate 50 in the VIPA plate 10 and the slab waveguide 52, are further angularly dispersed in a direction substantially perpendicular to the surface of the substrate 50 in the variable dispersion diffraction grating 20 formed on the substrate 50, to be output to the outside of the substrate. Accordingly, the focusing lens 31 is arranged above the substrate 50 according to the diffraction angle in the variable dispersion diffraction grating 20, and the output lights from the substrate 50 are condensed on the reflective surface of the three-dimensional mirror 32, so that an optical system similar to that in the fifth embodiment is formed. Thus, similar function and effect as in the fifth embodiment is achieved, and also the configuration of the apparatus can be simplified. Therefore, it becomes possible to achieve the miniaturization and cost reduction of the wavelength dispersion compensating apparatus.

In the above fifth and sixth embodiments, examples have been shown in which the waveguide type configuration is applied to the first embodiment. However, similarity, it is also possible to apply the waveguide type configuration to the second through fourth embodiments.

What is claimed is:

1. A wavelength dispersion compensating apparatus, comprising:
    an optical component having two mutually parallel reflective surfaces, in which a light condensed in the one-dimensional direction is incident between said reflective surfaces, and a part of said incident light is transmitted through one of said reflective surfaces while said incident light being multiple-reflected on the reflective surfaces, so that lights dispersed, due to interference by said transmitted light, in a substantially linear direction at different angles according to wavelengths are output;
    a lens which condenses the lights of respective wavelengths output from the optical component;
    a mirror having a reflective surface which reflects the lights which have passed through the lens to be condensed, in which said reflective surface has a shape capable to give constant wavelength dispersion to the lights of respective wavelengths output from said optical component, in a direction substantially parallel to a direction of angular dispersion in said optical component, and also capable to give different wavelength dispersion to the lights of respective wavelengths output from said optical component, in a direction substantially perpendicular to the direction of angular dispersion in said optical component; and
    a slide mechanism which slides said mirror in the direction substantially perpendicular to the direction of angular dispersion in said optical component, to vary the wavelength dispersion to be given to the lights of respective wavelengths output from said optical component according to a sliding amount of said mirror,
    wherein said wavelength dispersion compensating apparatus further comprises:
    a variable dispersion diffraction grating disposed between said optical component and said lens, which is capable to disperse the lights output from said optical component in different angles according to wavelengths, and also capable to change an amount of the angular dispersion, in the direction substantially perpendicular to the direction of angular dispersion in said optical component; and
    a rotation mechanism which rotates said lens and said mirror integrally about a reference point on said variable dispersion diffraction grating according to a diffraction angle in said variable dispersion diffraction grating, and
    wherein wavelength dispersion slope is varied independently of the wavelength dispersion, according to an angular dispersion amount of said variable dispersion diffraction grating and a rotation amount of said rotation mechanism.

2. A wavelength dispersion compensating apparatus according to claim 1,
    wherein a distance from said variable dispersion diffraction grating to said lens is made substantially equal to a distance from said lens to said mirror.

3. A wavelength dispersion compensating apparatus according to claim 1,
    wherein in place of said lens, there are provided:
    a first cylindrical lens disposed between said optical component and said variable dispersion diffraction grating, which condenses the lights of respective wavelengths output from said optical component, in a direction substantially parallel to the direction of angular dispersion in said optical component; and a second cylindrical lens disposed between said variable dispersion diffraction grating and said mirror, which condenses the lights of respective wavelengths output from said variable dispersion diffraction grating in the direction substantially perpendicular to the direction of angular dispersion in said optical component, and
    said rotation mechanism rotates said second cylindrical lens and said mirror integrally about the reference point on said variable dispersion diffraction grating, according to the diffraction angle in said variable dispersion diffraction grating.

4. A wavelength dispersion compensating apparatus according to claim 3,
    wherein a distance from said variable dispersion diffraction grating to said second cylindrical lens is made substantially equal to a distance from said second cylindrical lens to said mirror.

5. A wavelength dispersion compensating apparatus according to claim 1,
    wherein a position of said lens is changed between said optical component and said variable dispersion diffraction grating, and the lights of respective wavelengths output from said optical component are given to said mirror after passing in sequence through said lens and said variable dispersion diffraction grating, and
    said rotation mechanism rotates said mirror about the reference point on said variable dispersion diffraction grating, according to the diffraction angle in said variable dispersion diffraction grating.

6. A wavelength dispersion compensating apparatus according to claim 5, wherein said mirror has a reflective surface of a concave shape along an arc, which is centered on the reference point on said variable dispersion diffraction grating and passes through a center of said reflective surface, in the direction substantially perpendicular to the direction of angular dispersion in said optical component, and is rotated by said rotation mechanism, instead of being slid by said slide mechanism.

7. A wavelength dispersion compensating apparatus according to claim 1, wherein said variable dispersion diffraction grating includes: a flat plate formed from an acousto-optic material; an electrode formed on a surface of said flat plate; and a drive power source which supplies a high frequency signal to said electrode, to generate a surface acoustic wave in said flat plate, and changes a period of the diffraction grating formed on said flat plate according to a frequency of the high frequency signal supplied from said drive power source to said electrode.

8. A wavelength dispersion compensating apparatus according to claim 1, wherein said variable dispersion diffraction grating includes: a flat plate formed from a photo-refractive material; and a variable wavelength twin-beam interferometer which generates an interference fringe of light on said flat plate, and changes a period of the diffraction grating formed on said flat plate according to wavelengths and an intersection angle of two optical beams in said twin-beam interferometer.

9. A wavelength dispersion compensating apparatus according to claim 1, wherein said optical component is formed on a waveguide substrate, and lights having been propagated through said waveguide, are incident between said reflective surfaces, and the lights transmitted through one of said reflective surfaces are propagated through a slab waveguide, to interfere with each other.

10. A wavelength dispersion compensating apparatus according to claim 9, wherein said variable dispersion diffraction grating is formed on a portion corresponding to the slab waveguide on said waveguide substrate, and said lens condenses the lights of respective wavelengths emitted at different angles according to wavelengths, from a surface of said waveguide substrate by said variable dispersion diffraction grating, to give the condensed lights to said mirror.

* * * * *